United States Patent
Huang et al.

(10) Patent No.: US 12,224,947 B2
(45) Date of Patent: Feb. 11, 2025

(54) LINK AGGREGATION LOAD BALANCING APPARATUS FOR PERFORMING INITIAL ALLOCATION THROUGH LOAD MONITORING AND PERFORMING DYNAMIC ADJUSTMENT THROUGH FLOW STATISTICS AND ASSOCIATED LINK AGGREGATION LOAD BALANCING METHOD

(71) Applicant: Airoha Technology (Suzhou) Limited, Suzhou (CN)

(72) Inventors: Weihua Huang, Nanjing (CN); Fei Yan, Nanjing (CN); Lidong Hu, Nanjing (CN)

(73) Assignee: Airoha Technology (Suzhou) Limited, Suzhou (CN)

( * ) Notice: Subject to any disclaimer, the term of this patent is extended or adjusted under 35 U.S.C. 154(b) by 0 days.

(21) Appl. No.: 18/102,772

(22) Filed: Jan. 30, 2023

(65) Prior Publication Data

US 2024/0007411 A1    Jan. 4, 2024

(30) Foreign Application Priority Data

Jul. 4, 2022  (CN) .......................... 202210786509.8

(51) Int. Cl.
| | |
|---|---|
| *H04L 47/41* | (2022.01) |
| *H04L 45/24* | (2022.01) |
| *H04L 47/125* | (2022.01) |
| *H04L 47/2441* | (2022.01) |
| *H04L 47/80* | (2022.01) |

(52) U.S. Cl.
CPC ............ *H04L 47/41* (2013.01); *H04L 45/245* (2013.01); *H04L 47/125* (2013.01); *H04L 47/2441* (2013.01); *H04L 47/801* (2013.01)

(58) Field of Classification Search
CPC .... H04L 47/41; H04L 47/2441; H04L 47/801
See application file for complete search history.

(56) References Cited

U.S. PATENT DOCUMENTS

| | | | | |
|---|---|---|---|---|
| 2016/0088521 | A1* | 3/2016 | Ho | ......................... H04W 24/02 455/453 |
| 2017/0048147 | A1* | 2/2017 | Vaidya | ................. H04L 47/125 |
| 2021/0126834 | A1* | 4/2021 | Azzam | ............... H04L 43/0882 |
| 2022/0038382 | A1* | 2/2022 | Sankaran | ............ H04L 43/0894 |
| 2022/0329525 | A1* | 10/2022 | Lu | ............................ H04L 47/41 |

FOREIGN PATENT DOCUMENTS

| | | | |
|---|---|---|---|
| CN | 101635683 | A | 1/2010 |
| CN | 105379196 | A | 3/2016 |
| CN | 104756451 | B | 5/2018 |
| CN | 111108727 | A | 5/2020 |

\* cited by examiner

*Primary Examiner* — Schquita D Goodwin
*Assistant Examiner* — Joseph M Cousins
(74) *Attorney, Agent, or Firm* — Winston Hsu

(57) ABSTRACT

A link aggregation load balancing apparatus includes a flow monitoring circuit and an initial allocation circuit. The flow monitoring circuit is arranged to monitor flows of a plurality of member ports belonging to a link aggregation group, for performing classification upon the plurality of member ports to generate a member port classification result. The initial allocation circuit is arranged to refer to the member port classification result for selecting a target member port from the plurality of member ports to act as a forward port of a data flow.

18 Claims, 6 Drawing Sheets

LINK AGGREGATION LOAD BALANCING APPARATUS FOR PERFORMING INITIAL ALLOCATION THROUGH LOAD MONITORING AND PERFORMING DYNAMIC ADJUSTMENT THROUGH FLOW STATISTICS AND ASSOCIATED LINK AGGREGATION LOAD BALANCING METHOD

BACKGROUND OF THE INVENTION

1. Field of the Invention

The present invention relates to a link aggregation technique, and more particularly, to a link aggregation load balancing apparatus for performing initial allocation through flow monitoring and performing dynamic adjustment through flow statistics and an associated link aggregation load balancing method.

2. Description of the Prior Art

The link aggregation technique can aggregate multiple physical ports into a single logical port to make flows (amounts of traffic per unit time) of the multiple physical ports aggregated, thereby achieving the objective of increasing the link bandwidth without the need of upgrading the hardware. In addition, with the help of link aggregation, the link reliability can be improved. Theoretically, the maximum bandwidth of link aggregation is a sum of bandwidths of all member links belonging to the same link aggregation group. To maximize the bandwidth utilization rate of link aggregation, the flows are required to be evenly distributed to all member links for preventing a condition that some links suffer from congestion and other links are relatively idle. Thus, there is a need for an innovative apparatus and method capable of achieving a load balance of the link aggregation.

SUMMARY OF THE INVENTION

One of the objectives of the claimed invention is to provide a link aggregation load balancing apparatus for performing initial allocation through flow monitoring and performing dynamic adjustment through flow statistics and an associated link aggregation load balancing method.

According to a first aspect of the present invention, an exemplary link aggregation load balancing apparatus is disclosed. The exemplary link aggregation load balancing apparatus includes a flow monitoring circuit and an initial allocation circuit. The flow monitoring circuit is arranged to monitor flows of a plurality of member ports belonging to a link aggregation group, for performing classification upon the plurality of member ports to generate a member port classification result. The initial allocation circuit is arranged to refer to the member port classification result for selecting a target member port from the plurality of member ports to act as a forward port of a data flow.

According to a second aspect of the present invention, an exemplary link aggregation load balancing method is disclosed. The exemplary link aggregation load balancing method includes: monitoring flows of a plurality of member ports belonging to a link aggregation group, for performing classification upon the plurality of member ports to generate a member port classification result; and referring to the member port classification result for selecting a target member port from the plurality of member ports to act as a forward port of a data flow.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
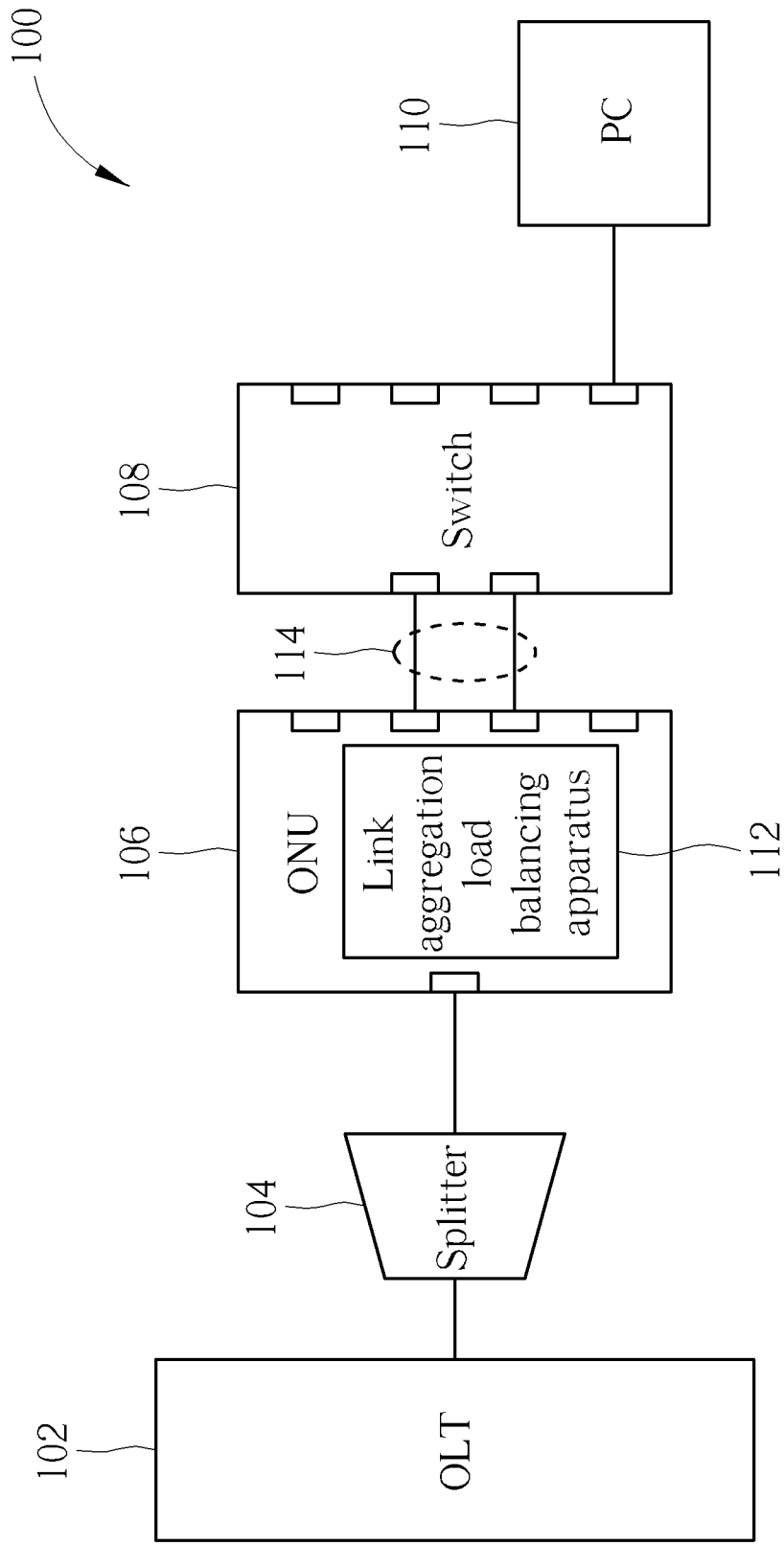
FIG. 1 is a diagram illustrating a network system according to an embodiment of the present invention.

FIG. 1 is a diagram illustrating a network system according to an embodiment of the present invention. In this embodiment, the network system 100 adopts an optical network, and therefore includes an optical line terminal (OLT) 102, a splitter 104, and an optical network unit (ONU) 106. In addition, a personal computer (PC) 110 can be connected to the ONU 106 through a switch 108. In this embodiment, both of the switch 108 and the ONU 106 support the link aggregation technology. In addition, the ONU 106 employs a link aggregation load balancing apparatus 112 proposed by the present invention, and maximizes the bandwidth utilization rate of a plurality of member links 114 through a link aggregation load balancing method proposed by the present invention. However, this is for illustrative purposes only, and is not meant to be a limitation of the present invention. In practice, any network equipment (e.g., switch or router) using the link aggregation load balancing apparatus and link aggregation load balancing method proposed by the present invention falls within the scope of the present invention. Regarding a forward port setting of a data flow, the link aggregation load balancing apparatus and link aggregation load balancing method proposed by the present invention perform initial allocation through flow monitoring and perform dynamic adjustment through flow statistics. Further details are described below with reference to the accompanying drawings.

Figure 2:
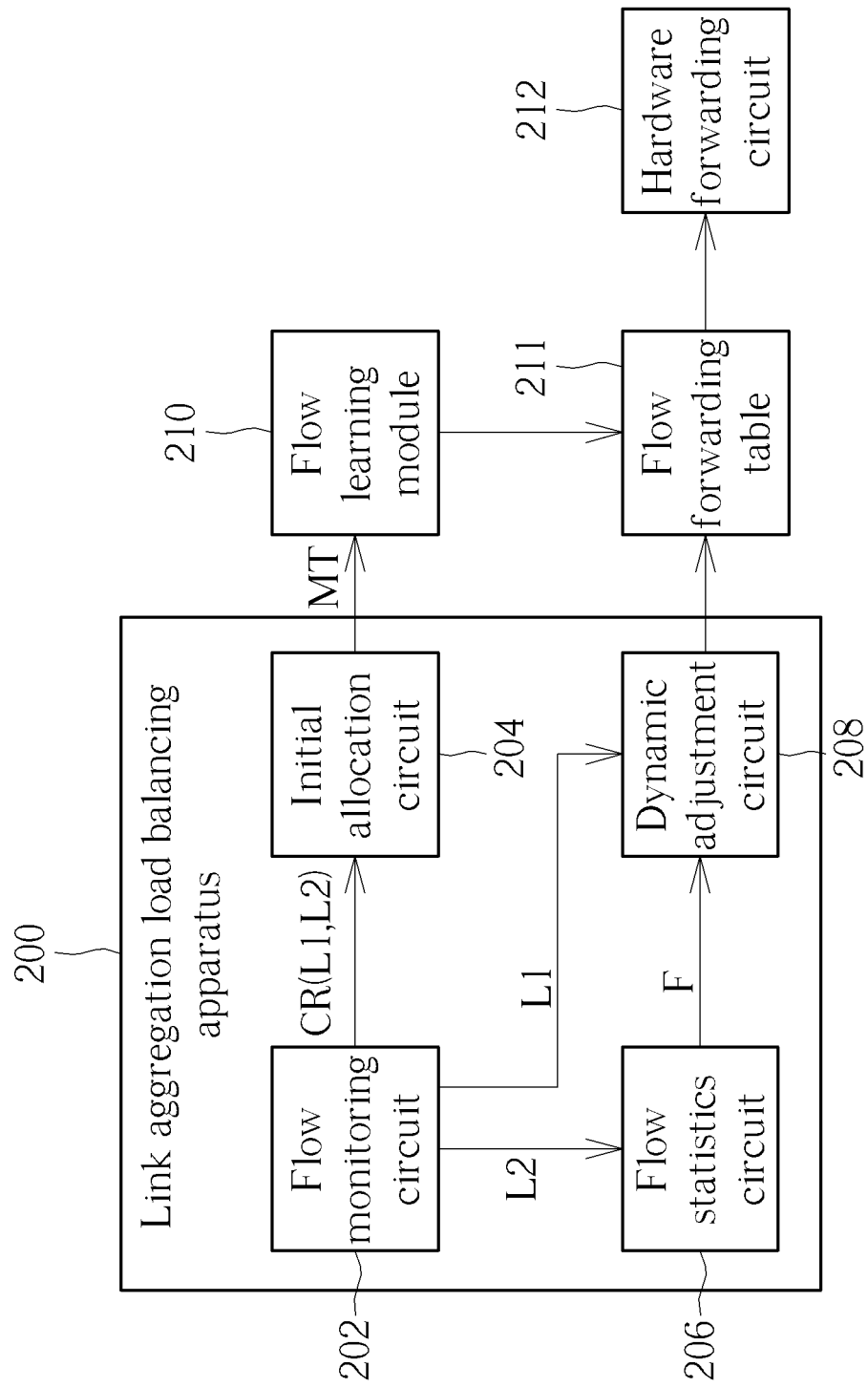
FIG. 2 is a diagram illustrating a link aggregation load balancing apparatus according to an embodiment of the present invention.

FIG. 2 is a diagram illustrating a link aggregation load balancing apparatus according to an embodiment of the present invention. The link aggregation load balancing apparatus 112 shown in FIG. 1 can be implemented by the link aggregation load balancing apparatus 200 shown in FIG. 2. In this embodiment, the link aggregation load balancing apparatus 200 includes a flow monitoring circuit 202, an initial allocation circuit 204, a flow statistics circuit 206, and a dynamic adjustment circuit 208. The initial allocation circuit 204 is arranged to provide a mapping table MT of data flow and forward port to a flow learning module 210. The flow learning module 210 may be a software module used for dealing with software-based forwarding. In addition, the flow learning module 210 may refer to the mapping table MT of data flow and forward port to learn and set a flow forwarding table 211. The flow forwarding table 211 is arranged to record flow forwarding rules. The hardware forwarding circuit 212 is arranged to refer to the flow forwarding table 211 to achieve acceleration of hardware-based forwarding. Since the present invention is focused on the link aggregation load balancing apparatus 200 and a person skilled in the pertinent art can readily understand functions and principles of the flow learning module 210 and the hardware forwarding circuit 212, further description of the flow learning module 210 and the hardware forwarding circuit 212 is omitted here for brevity.

Figure 3:
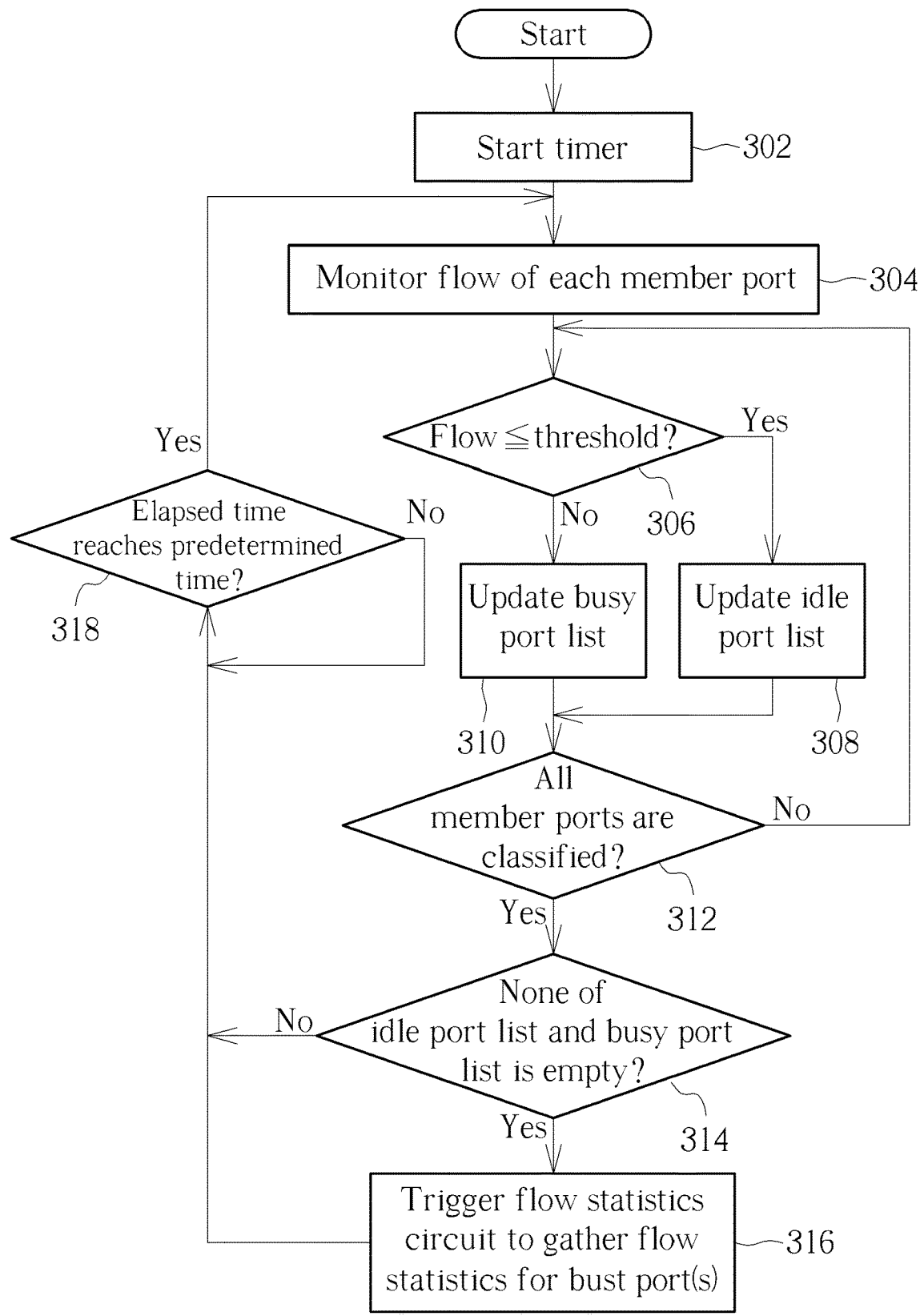
FIG. 3 is a flowchart illustrating a flow monitoring method according to an embodiment of the present invention.

The flow monitoring circuit is arranged to monitor flows (amounts of traffic per unit time) of a plurality of member ports belonging to a link aggregation group, for performing classification upon the plurality of member ports to generate a member port classification result CR. For example, the member port classification result CR may include an idle port list L1 and a busy port list L2. FIG. 3 is a flowchart illustrating a flow monitoring method according to an embodiment of the present invention. The flow monitoring method shown in FIG. 3 is a part of the link aggregation load balancing method proposed by the present invention, and can be performed by the flow monitoring circuit 202. Provided that the result is substantially the same, the steps are not required to be executed in the exact order shown in FIG. 3. The flow monitoring circuit 202 is arranged to periodically monitor the flow of each member port. Hence, at step 302, the flow monitoring circuit 202 starts a timer (not shown) to determine the timing of performing the next flow monitoring. That is, at step 318, the flow monitoring circuit 202 determines if an elapsed time counted by the timer reaches a predetermined time (e.g., the timer counts down to a zero value). When the elapsed time counted by the timer reaches the predetermined time, the timer restarts its counting of the elapsed time, and the process enters step 304 again. At step 304, the flow monitoring circuit 202 monitors the flow of each member port. At step 306, the flow monitoring circuit 202 sequentially compares the flow of each member port with a threshold value a, for determining if the flow is not larger than the threshold value a. If the flow is not larger than the threshold value a, the flow monitoring circuit 202 classifies the associated member port as an idle port and updates the idle port list L1 (step 308), wherein the idle port list L1 is arranged to record any member port that is classified as an idle port and its corresponding flow value. If the flow is larger than the threshold value a, the flow monitoring circuit 202 classifies the associated member port as a busy port and updates the busy port list L2 (step 310), wherein the busy port list L2 is arranged to record any member port that is classified as a busy port and its corresponding flow value. The operation of classifying a member port into an idle port or a busy port is performed repeatedly, until classification of all member ports belonging to the same link aggregation group is completed (step 312).

If all member ports in the link aggregation group are idle ports, the busy port list L2 is an empty list, and the idle port list L1 is not an empty list. If all member ports in the link aggregation group are busy ports, the idle port list L1 is an empty list, and the busy port list L2 is not an empty list. If member ports in the link aggregation group include busy port(s) and idle port(s), none of the idle port list L1 and the busy port list L2 is an empty list.

At step 314, the flow monitoring circuit 202 determines if none of the idle port list L1 and the busy port list L2 is an empty list. If none of the idle port list L1 and the busy port list L2 is empty, it implies that member ports of the link aggregation group include busy port(s) as well as idle port(s), such that the link aggregation load balancing apparatus 200 may still have the chance of applying dynamic adjustment to the current forward port in the future. Thus, the flow monitoring circuit 202 triggers the flow statistics circuit 206 to gather flow statistics for busy port(s) (step 316). If at least one of the idle port list L1 and the busy port list L2 is empty, it implies that member ports of the link aggregation group do not include busy port(s) and idle port(s) at the same time, such that the link aggregation load balancing apparatus 200 has no chance of applying dynamic adjustment to the current forward port in the future. Thus, the flow monitoring circuit 202 does not need to trigger the flow statistics circuit 206 to gather flow statistics for busy port(s).

Figure 4:
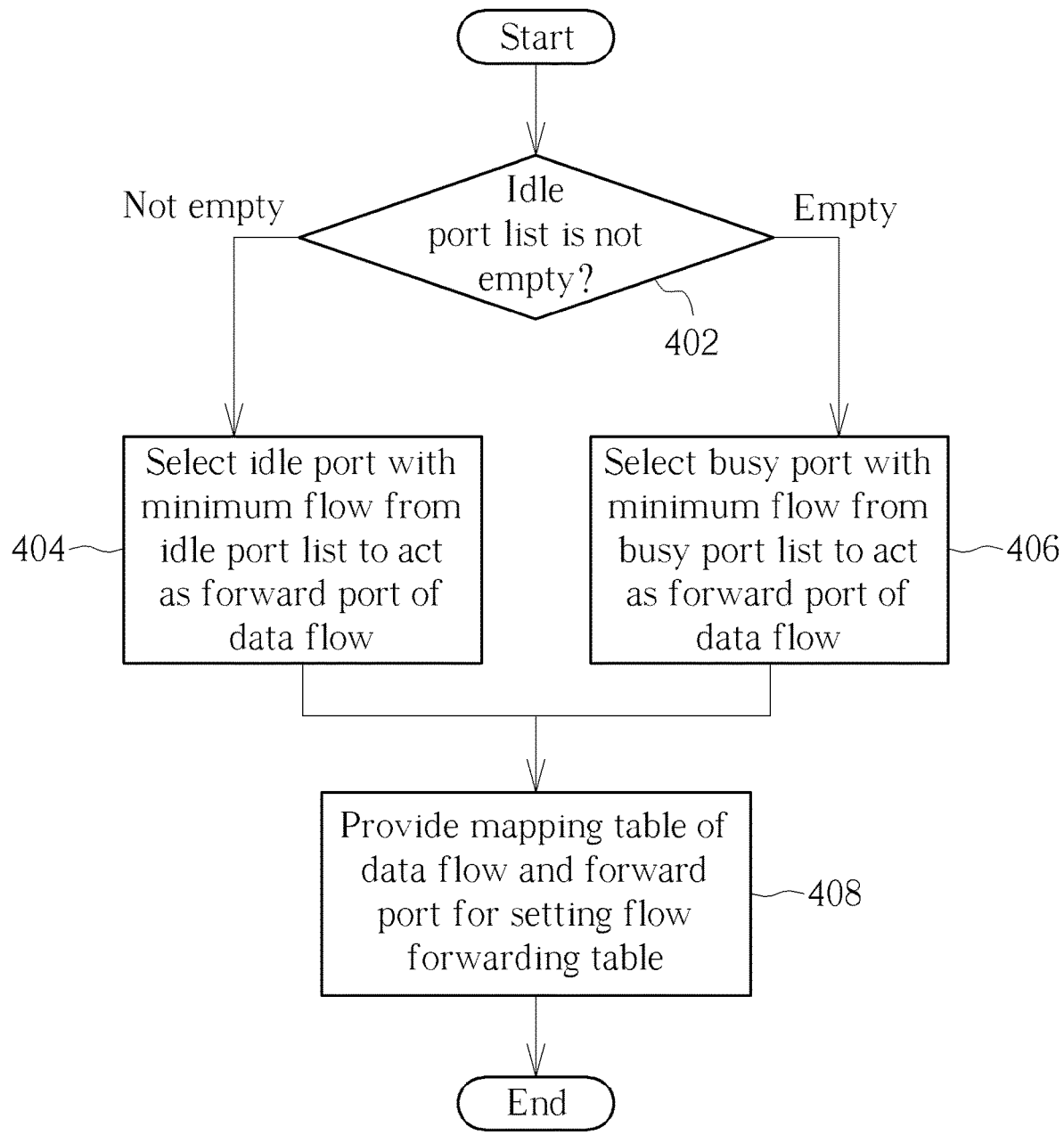
FIG. 4 is a flowchart illustrating an initial allocation method according to an embodiment of the present invention.

The initial allocation circuit 204 is arranged to refer to the member port classification result CR (which includes the idle port list L1 and the busy port list L2) to select a target member port from a plurality of member ports belonging to the same link aggregation group as a forward port of a data flow. For example, where there is a new data flow that needs to be forwarded to the switch 108 through the ONU 106 shown in FIG. 1, the link aggregation load balancing apparatus 112 allocates a forward port for the new data flow. Considering a case where the link aggregation load balancing apparatus 112 is implemented by the link aggregation load balancing apparatus 200 shown in FIG. 2, the initial allocation circuit 204 is aware of a status of each member port by referring to the member port classification result CR, and selects a suitable member port as the forward port of the data flow accordingly. FIG. 4 is a flowchart illustrating an initial allocation method according to an embodiment of the present invention. The initial allocation method shown in FIG. 4 is a part of the link aggregation load balancing method proposed by the present invention, and can be performed by the initial allocation circuit 204. Provided that the result is substantially the same, the steps are not required to be executed in the exact order shown in FIG. 4. At step 402, the initial allocation circuit 204 receives the member port classification result CR provided from the flow monitoring circuit 202, and determines if the idle port list L1 is not empty. If the idle port list L1 is not empty, it means that member ports of the link aggregation group include at least one idle port. At this moment, regarding forward port allocation for the data flow at the initial allocation circuit 204, selecting an idle port takes precedence over selecting a busy port. Hence, the initial allocation circuit 204 selects an idle port with a minimum flow among idle port(s) listed in the idle port list L1 (which records at least one idle port) to act as the target member port (step 404). That is, the initial allocation circuit 204 allocates the idle port with the minimum flow to the new data flow to act as the forward port of the new data flow. If the idle port list L1 is empty, it means that all member ports of the link aggregation group are busy ports. At this moment, the initial allocation circuit 204 can only select a busy port to allocate the forward port for the data flow. Hence, the initial allocation circuit 204 selects a busy port with a minimum flow among busy ports listed in the busy port list L2 (which records multiple busy ports) to act as the target member port (step 406). That is, the initial allocation circuit 204 allocates the busy port with the minimum flow to act as the forward port of the new data flow. At step 408, the initial allocation circuit 204 provides the mapping table MT of data flow and forward port to the flow learning module 210, such that the flow learning module 210 can refer to the mapping table MT to set the flow forwarding table 211.

Figure 5:
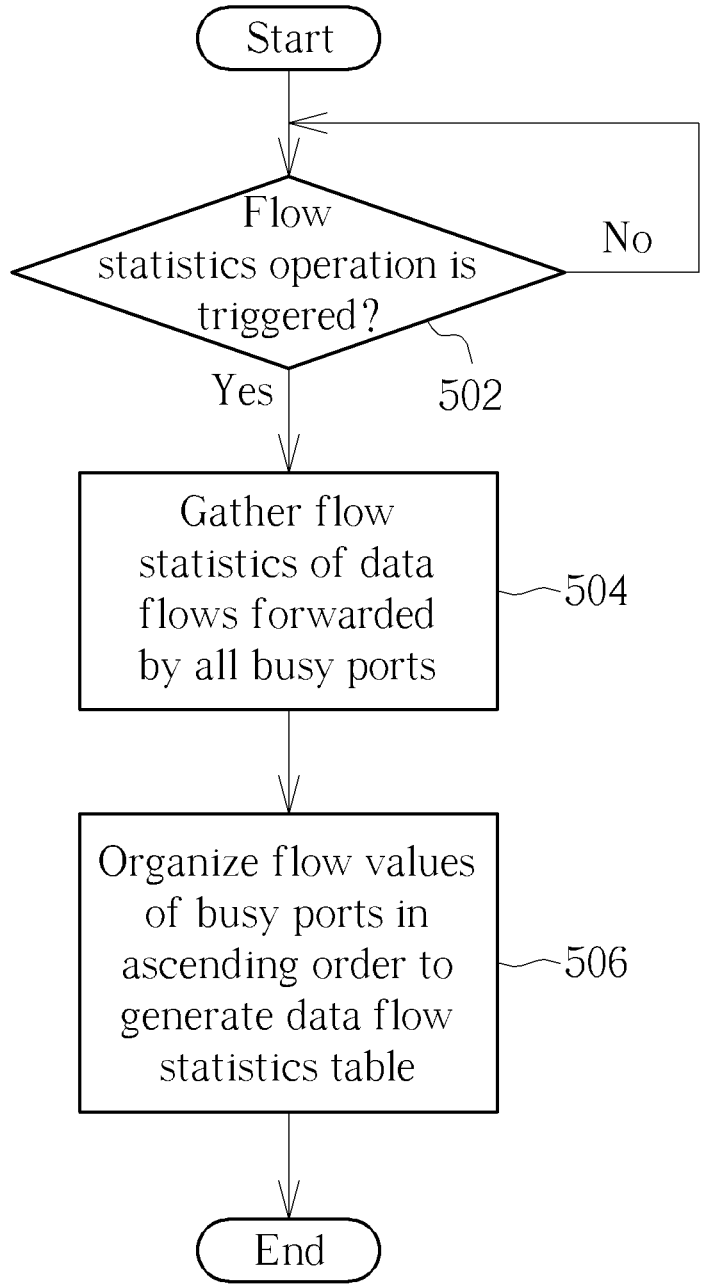
FIG. 5 is a flowchart of a flow statistics method according to an embodiment of the present invention.

As mentioned above, if none of the idle port list L1 and the busy port list L2 is empty, it means that member ports of the link aggregation group include busy port (s) as well as idle port(s), such that the link aggregation load balancing apparatus 200 may still have the chance of applying dynamic adjustment to the current forward port in the future. Hence, the flow monitoring circuit 202 triggers the flow statistics circuit 206 to gather flow statistics for busy port(s). In addition, the flow monitoring circuit 202 further provides the busy port list L2 to the flow statistics circuit 206. Next, the flow statistics circuit 206 gathers flow statistics for each busy port listed in the busy port list L2, for generating a busy port flow statistics result (e.g., a data flow statistics table F of all bust ports). FIG. 5 is a flowchart of a flow statistics method according to an embodiment of the present invention. The flow statistics method shown in FIG. 5 is a part of the link aggregation load balancing method proposed by the present invention, and can be performed by the flow statistics circuit 206. Provided that the result is substantially the same, the steps are not required to be executed in the exact order shown in FIG. 5. At step 502, the flow statistics circuit 206 determines if a flow statistics operation regarding busy port(s) is triggered. After the flow monitoring circuit 202 triggers the flow statistics circuit 206 to gather flow statistics for busy port(s), the flow statistics circuit 206 is operative to gather flow statistics of data flows forwarded by all busy ports (step 504). At step 506, the flow statistics circuit 206 organizes flow values of busy ports in an ascending order (i.e., from smallest to largest) to generate a data flow statistics table F. For example, the minimum flow recorded in the data flow statistics table F is $F_{min}$.

Figure 6:
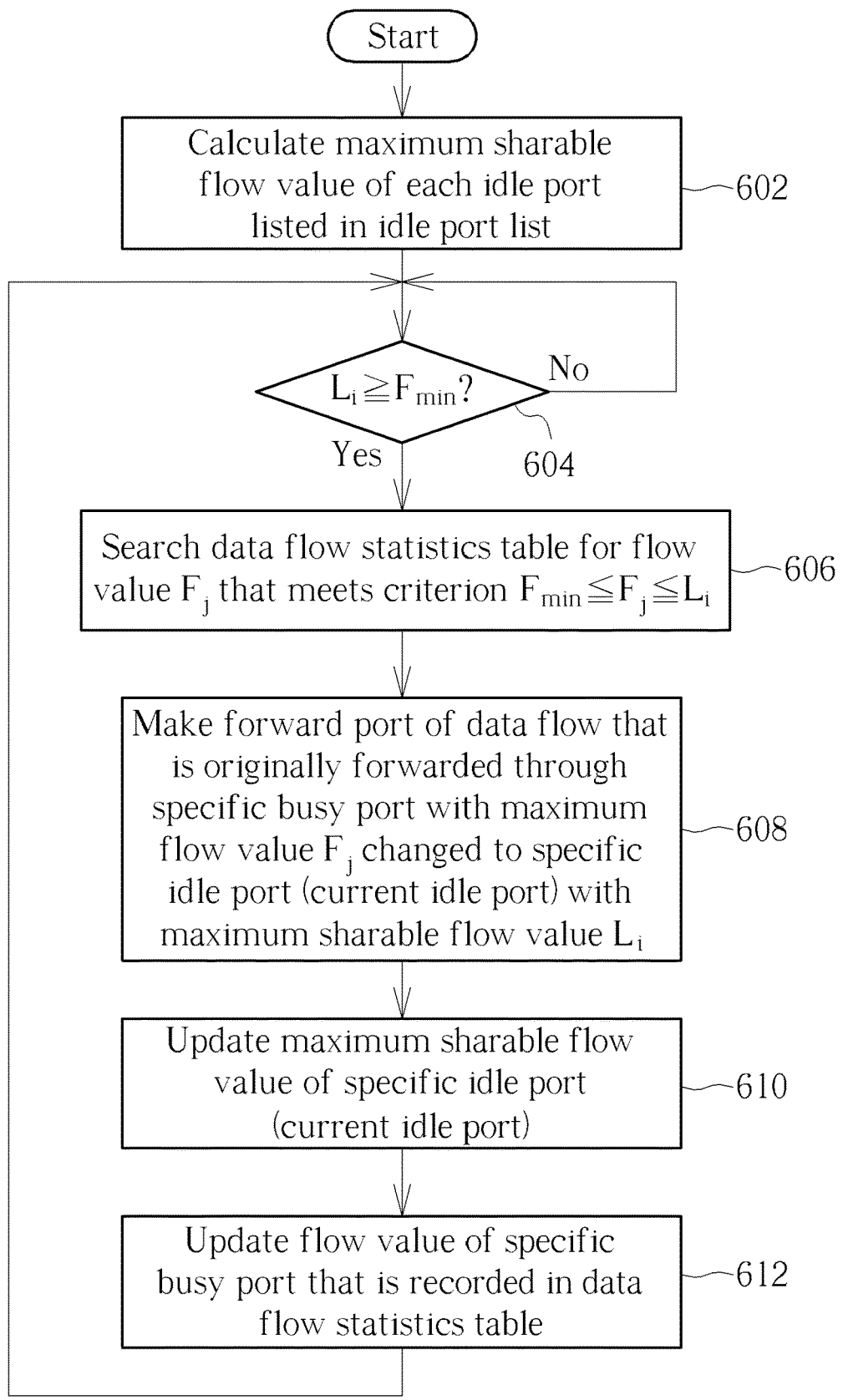
FIG. 6 is a flowchart illustrating a dynamic adjustment method according to an embodiment of the present invention.

The dynamic adjustment circuit 208 is arranged to refer to the busy port flow statistics result (e.g., data flow statistics table F) to dynamically adjust a forward port of a specific data flow. For example, the specific data flow is currently being forwarded through a busy port. Under a condition that certain criteria are met, the dynamic adjustment circuit 208 can adjust the flow forwarding table 211 to make the forward port switched from the busy port to an idle port during a forwarding process of the specific data flow. That is, one part of the specific data flow is first forwarded through the busy port, and another part of the specific data flow is later forwarded through the idle port. FIG. 6 is a flowchart illustrating a dynamic adjustment method according to an embodiment of the present invention. The dynamic adjustment method shown in FIG. 6 is a part of the link aggregation load balancing method proposed by the present invention, and can be performed by the dynamic adjustment circuit 208. Provided that the result is substantially the same, the steps are not required to be executed in the exact order shown in FIG. 6. At step 602, the dynamic adjustment circuit 208 calculates a maximum sharable flow value $L_i$ of each idle port listed in the idle port list L1. For example, a maximum sharable flow value $L_i$ of an idle port is equal to the threshold value a minus the current flow $T_i$ of the idle port, that is, $L_i=a-T_i$. At step 604, the dynamic adjustment circuit 208 sequentially checks maximum sharable flow values $L_i$ obtained at step 602, to determine if a maximum sharable flow value $L_i$ not smaller than the minimum flow $F_{min}$ exists. If a maximum sharable flow value $L_i$ of an idle port is not smaller than the minimum flow $F_{min}$, it means that this idle port can be used to share the burden of forwarding a partial flow at the busy port, and the process proceeds with step 606. However, if a maximum sharable flow value $L_i$ of an idle port is smaller than the minimum flow $F_{min}$, it means that this idle port is unable to share the burden of forwarding a partial flow at the busy port, and the process returns to step 604 to keep checking a maximum sharable flow value $L_i$ of another idle port.

If a maximum sharable flow value $L_i$ of a specific idle port is not smaller than the minimum flow $F_{min}$ and a specific data flow is originally forwarded through a specific busy port, the dynamic adjustment circuit 208 dynamically adjusts the flow forwarding table 211 to make a forward port of the specific data flow changed from the specific busy port to the specific idle port. In this embodiment, to reduce the number of times of dynamically adjusting the forward port, the specific busy port selected by the dynamic adjustment circuit 208 has a maximum flow value $F_j$ among all flow values recorded in the busy port flow statistics result (e.g., data flow statistics table F) and is not larger than the maximum sharable flow value $L_i$. However, this is for illustrative purposes only, and is not meant to be a limitation of the present invention.

At step 606, the dynamic adjustment circuit 208 finds the maximum flow value $F_j$ from all flow values in the data flow statistics table F, where the maximum flow value $F_j$ is not larger than the maximum sharable flow value $L_i$ of the current idle port ($F_{min} \leq F_j \leq L_i$). Subsequently, the specific busy port with the maximum flow value $F_j$ offloads its flow to the specific idle port (current idle port) with the maximum sharable flow value $L_i$. At step 608, the dynamic adjustment circuit 208 adjusts the flow forwarding table 211, such that a forward port of the data flow that is originally forwarded through the specific busy port with the maximum flow value $F_j$ is changed to the specific idle port (current idle port) with the maximum sharable flow value $L_i$. After dynamic adjustment of the forward port is completed, the dynamic adjustment circuit 208 updates the maximum sharable flow value of the specific idle port (current idle port), that is, $L_i=L_i-F_j$ (step 610), and updates the flow value of the specific busy port recorded in the busy port flow statistics result (e.g. data flow statistics table F), that is, $F_j=0$ (step 612). The process returns to step 604 to keep checking a maximum sharable flow value $L_i$ of another idle port.

Compared to the software-based forwarding learning phase that adopts a round-robin manner to allocate multiple data flows to multiple member ports according to a transmission sequence of the multiple data flows, the present invention performs initial allocation through flow monitoring. Since the actual flow of each member port is referenced to allocate a forward port for a data flow, there is higher probability of achieving the load balance. In addition, compared to the hardware-based forwarding phase that adopts a fixed forward port setting, the present invention performs dynamic adjustment upon the flow forwarding table through flow statistics. Even though the same data flow may have flow fluctuation during the forwarding process, making a forward port dynamically switched from a busy port to an idle port is capable of preventing an unbalance phenomenon of a forward port that results from flow congestion at the forward port or an idle status of the forward port.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A link aggregation load balancing method comprising:
    monitoring flows of a plurality of member ports belonging to a link aggregation group, for performing classification upon the plurality of member ports to generate a member port classification result;
    referring to the member port classification result for selecting a target member port from the plurality of member ports, and initially allocating the target member port as a forward port of a data flow;
    gathering flow statistics of each busy port included in the plurality of member ports, for generating a busy port flow statistics result; and
    dynamically adjusting a forward port of a specific data flow according to the busy port flow statistics result;
    wherein monitoring the flows of the plurality of member ports belonging to the link aggregation group, for performing classification upon the plurality of member ports to generate the member port classification result comprises:
    generating the member port classification result by comparing a flow of each member port included in the plurality of member ports with a threshold value to classify said each member port into an idle port or a busy port; and
    referring to the member port classification result to determine whether to trigger gathering the flow statistics of said each busy port included in the plurality of member ports.

2. The link aggregation load balancing method of claim 1, wherein gathering the flow statistics of said each busy port included in the plurality of member ports is not triggered unless the member port classification result indicates that plurality of member ports belonging to the link aggregation group include at least one idle port and at least one busy port at a same time.

3. The link aggregation load balancing method of claim 1, wherein referring to the member port classification result for selecting the target member port from the plurality of member ports to act as the forward port of the data flow comprises:
    in response to the member port classification result indicating that the plurality of member ports comprise at least one idle port, selecting an idle port with a minimum flow from the at least one idle port to act as the target member port.

4. The link aggregation load balancing method of claim 1, wherein referring to the member port classification result for selecting the target member port from the plurality of member ports to act as the forward port of the data flow comprises:
    in response to the member port classification result indicating that all of the plurality of member ports are busy ports, selecting a busy port with a minimum flow from the plurality of member ports to act as the target member port.

5. The link aggregation load balancing method of claim 1, wherein gathering the flow statistics of said each busy port included in the plurality of member ports, for generating the busy port flow statistics result comprises:
    in response to the member port classification result indicating that the plurality of member ports comprises the at least one busy port and the at least one idle port, gathering the flow statistics of said each busy port included in the plurality of member ports.

6. The link aggregation load balancing method of claim 5, wherein dynamically adjusting the forward port of the specific data flow according to the busy port flow statistics result comprises:
    referring to the busy port flow statistics result to make the forward port of the specific data flow changed from a specific busy port included in the plurality of member ports to a specific idle port included in the plurality of member ports.

7. The link aggregation load balancing method of claim 6, wherein a maximum sharable flow value of the specific idle port is not smaller than a minimum flow value among all flow values recorded in the busy port flow statistics result, and a flow value of the specific busy port that is recorded in the busy port flow statistics result is not larger than the maximum sharable flow value of the specific idle port.

8. The link aggregation load balancing method of claim 7, further comprising:
    after the forward port of the specific data flow is changed to the specific idle port, updating the flow value of the specific busy port that is recorded in the busy port flow statistics result, and updating the maximum sharable flow value of the specific idle port.

9. The link aggregation load balancing method of claim 6, wherein the flow value of the specific busy port is a maximum flow value among all flow values recorded in the busy port flow statistics result, and is not larger than the maximum sharable flow value of the specific idle port.

10. A link aggregation load balancing apparatus comprising:
    a flow monitoring circuit, arranged to monitor flows of a plurality of member ports belonging to a link aggregation group, for performing classification upon the plurality of member ports to generate a member port classification result;
    an initial allocation circuit, arranged to refer to the member port classification result for selecting a target member port from the plurality of member ports, and initially allocate the target member port as a forward port of a data flow;
    a flow statistics circuit, arranged to gather flow statistics of each busy port included in the plurality of member ports, for generating a busy port flow statistics result; and
    a dynamic adjustment circuit, arranged to dynamically adjust a forward port of a specific data flow according to the busy port flow statistics result;
    wherein the flow monitoring circuit generates the member port classification result by comparing a flow of each member port included in the plurality of member ports with a threshold value to classify said each member port into an idle port or a busy port; and the flow monitoring circuit refers to the member port classification result to determine whether to trigger the flow statistics circuit to gather the flow statistics of said each busy port included in the plurality of member ports.

11. The link aggregation load balancing apparatus of claim 10, wherein the flow monitoring circuit does not trigger the flow statistics circuit to gather the flow statistics of said each busy port included in the plurality of member ports unless the member port classification result indicates that plurality of member ports belonging to the link aggregation group include at least one idle port and at least one busy port at a same time.

12. The link aggregation load balancing apparatus of claim 10, wherein in response to the member port classification result indicating that the plurality of member ports comprise at least one idle port, the initial allocation circuit selects an idle port with a minimum flow from the at least one idle port to act as the target member port.

13. The link aggregation load balancing apparatus of claim 10, wherein in response to the member port classification result indicating that all of the plurality of member ports are busy ports, the initial allocation circuit selects a busy port with a minimum flow from the plurality of member ports to act as the target member port.

14. The link aggregation load balancing apparatus of claim 10, wherein in response to the member port classification result indicating that the plurality of member ports comprises the at least one busy port and the at least one idle port, the flow statistics circuit gathers the flow statistics of said each busy port included in the plurality of member ports.

15. The link aggregation load balancing apparatus of claim 14, wherein the dynamic adjustment circuit refers to the busy port flow statistics result to make the forward port of the specific data flow changed from a specific busy port included in the plurality of member ports to a specific idle port included in the plurality of member ports.

16. The link aggregation load balancing apparatus of claim 15, wherein the dynamic adjustment circuit further calculates a maximum sharable flow value of the specific idle port, the maximum sharable flow value of the specific idle port is not smaller than a minimum flow value among all flow values recorded in the busy port flow statistics result, and a flow value of the specific busy port that is recorded in the busy port flow statistics result is not larger than the maximum sharable flow value of the specific idle port.

17. The link aggregation load balancing apparatus of claim 16, wherein after the forward port of the specific data flow is changed to the specific idle port, the dynamic adjustment circuit updates the flow value of the specific busy port that is recorded in the busy port flow statistics result, and updates the maximum sharable flow value of the specific idle port.

18. The link aggregation load balancing apparatus of claim 15, wherein the flow value of the specific busy port is a maximum flow value among all flow values recorded in the busy port flow statistics result, and is not larger than the maximum sharable flow value of the specific idle port.

* * * * *